G. HEYDRICH.
MILLSTONE-DRESSING MACHINE.

No. 169,440. Patented Nov. 2, 1875.

WITNESSES:

INVENTOR:
G. Heydrich
BY
ATTORNEYS.

UNITED STATES PATENT OFFICE.

GUSTAV HEYDRICH, OF NEW ULM, MINNESOTA.

IMPROVEMENT IN MILLSTONE-DRESSING MACHINES.

Specification forming part of Letters Patent No. 169,440, dated November 2, 1875; application filed September 17, 1875.

*To all whom it may concern:*

Figure 1:
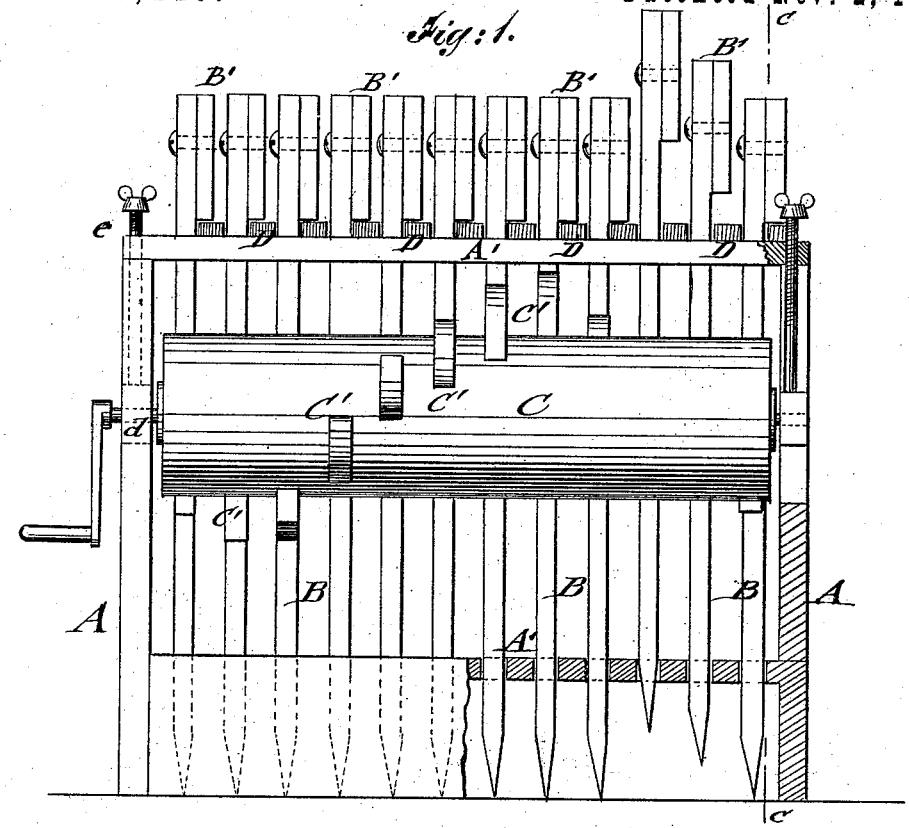
Figure 2:
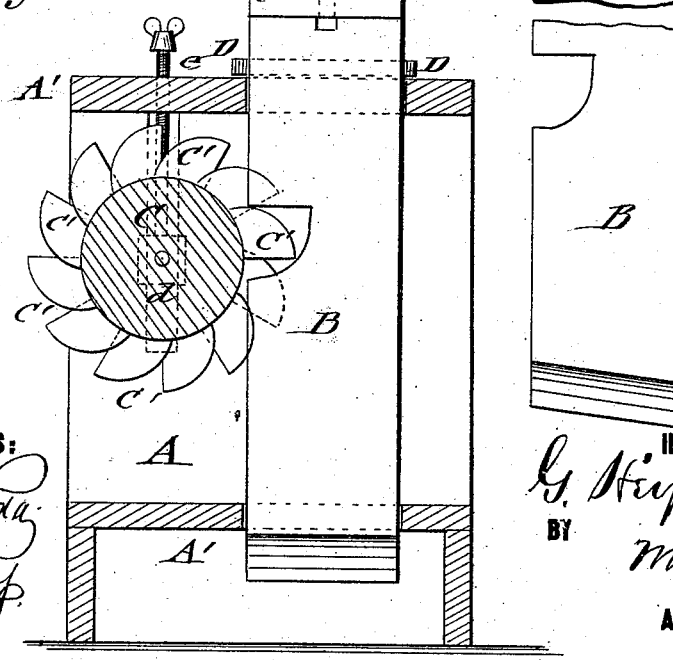
Figure 3:
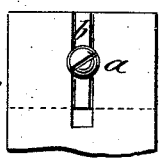

Be it known that I, GUSTAV HEYDRICH, of New Ulm, in the county of Brown and State of Minnesota, have invented a new and Improved Millstone-Dressing Machine, of which the following is a specification:

In the accompanying drawing, Figure 1 represents a front elevation, partly in section, of my improved millstone-dressing machine; Fig. 2, a vertical transverse section of the same on the line $c\ c$, Fig. 1; and Fig. 3, a side view of a chisel, with inclined edge employed for cutting the furrows.

Similar letters of reference indicate corresponding parts.

My invention relates to an improved millstone-dressing machine for dressing and furrowing the face of a millstone in rapid and even manner; and the invention consists of a series of adjustable and recessed chisels, operated by a revolving shaft or cylinder, which is hung in vertically-adjustable bearings, and provided with spirally-arranged cams, the chisels being cushioned by rubber blocks that regulate the action of chisels.

In the drawing, A represents the supporting-frame of my millstone-dressing machine, which guides, in recessed top and bottom pieces A', the vertically-moving chisels B. To the slotted upper ends of the chisels are applied, by clamp-screws $a$, shoulder-plates B', with guide-strips $b$, along which the chisels are adjusted for being lengthened after sharpening.

The chisels B are recessed about midway of their height, and raised and dropped by a revolving shaft or roller, C, with projecting cams C' of quadrantal shape, that are arranged spirally around the circumference of roller C, so that each revolution of the same raises and drops all the chisels. The projecting cams enter readily into the recesses of the chisels, raise the same, and drop them suddenly on leaving the recesses, the weight of the chisels, in connection with the height of the cams, producing the cutting action. The bearings $d$ of the roller C are made adjustable by set-screws $e$ in side recesses of frame A, for the purpose of setting the cams to the gradually-lowered position of the chisel-recesses, according as the chisels are getting shorter by sharpening, and have to be adjusted along the shoulder-plates B'. Rubber cushioning-blocks D are placed on the top of frame A, below the shoulder-plates B, to deaden the noise of the chisels, and allow their being worked in uniform manner by setting the chisels with their cutting-edges to a level with the stone, and producing the cutting action by the compression of the rubber blocks by the force of the strokes, the chisels being instantly raised by the rubber blocks after their stroke is completed. The dressing of the millstone is thus rapidly and evenly accomplished, the machine being also available for cutting the furrows by using a series of chisels with cutting-edges inclined according to the depth of furrows to be produced.

I am aware it is not new to operate chisels by means of a toothed cylinder, and do not claim such mode.

Having thus described my invention, I claim as new and desire to secure by Letters Patent—

1. The roller C, having spirally-arranged cams, the adjusting-screws $e$, and vertically-adjustable recessed chisels B, combined as shown and described, whereby the roll may be adjusted to set the cams at a height corresponding to the chisels, as set forth.

2. The chisels being adjustable in length by top shoulder-plates and clamp-screws, in combination with cushioning-blocks to produce even dressing of stone, substantially as specified.

GUSTAV HEYDRICH.

Witnesses:
 CHARLES ROOS,
 AUGUST DURRHAMMER.